(12) United States Patent
Ulbrich

(10) Patent No.: US 9,979,290 B2
(45) Date of Patent: May 22, 2018

(54) DUAL USE BOOTSTRAP DRIVER

(71) Applicant: Integrated Deivce Technology, Inc., San Jose, CA (US)

(72) Inventor: Stephen Ulbrich, Anaheim, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days. days.

(21) Appl. No.: 15/265,125

(22) Filed: Sep. 14, 2016

(65) Prior Publication Data

US 2018/0076711 A1 Mar. 15, 2018

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 2001/0054* (2013.01)

(58) Field of Classification Search
CPC .......... H02M 1/08; H02M 1/088; H02M 1/14; H02M 3/156; H02M 3/158; H02M 2001/0048; H02M 2001/0054; H02M 2003/158
See application file for complete search history.

(56) References Cited

U.S. PATENT DOCUMENTS

| 6,507,500 | B2* | 1/2003 | Liang | H02M 1/44 363/131 |
| 2001/0005322 | A1* | 6/2001 | Uchida | H02M 1/34 363/97 |
| 2013/0193937 | A1* | 8/2013 | Horie | G05F 1/595 323/271 |
| 2015/0085550 | A1* | 3/2015 | Mueller | H02M 3/158 363/132 |

OTHER PUBLICATIONS

International Search Report for PCT Application No. PCT/US2017/049601 Issued by the U.S. International Searching Authority dated Sep. 21, 2017; pp. 1-6.
Written Opinion for PCT Application No. PCT/US2017/049601 Issued by the U.S. International Searching Authority dated Sep. 21, 2017; pp. 1-5.

* cited by examiner

*Primary Examiner* — Matthew Nguyen
(74) *Attorney, Agent, or Firm* — Haynes and Boone, LLP.

(57) ABSTRACT

A switching regulator is presented. An embodiment of the switching regulator can include a high switch coupled between an input voltage and a switched output; a low switch coupled between the switched output and a ground; and a ringing switch coupled between a capacitor and the switched output, wherein the ringing switch is closed prior to transition into a tristate where both the high switch and the low switch are open.

14 Claims, 3 Drawing Sheets

DUAL USE BOOTSTRAP DRIVER

TECHNICAL FIELD

Embodiments of the present invention are related to bootstrap drivers.

DISCUSSION OF RELATED ART

In many switching regulators, in order to reduce switching losses or to disconnect the power switches for other purposes, both the high side and the low side power switches are usually turned off about the same time. This is the so-called tri-state mode. Due to the power inductor and parasitic switching node capacitance from the MOSFETs, the switching node will have a ringing response waveform whose voltage amplitude could exceed the power supply voltage. This large ringing waveform can cause both EMI interference issues in the system and high voltage stress on the power devices.

Therefore, there is a need reduce the ringing effect when the power switches are disconnected.

SUMMARY

In accordance with aspects of embodiments of a switching regulator, a switching regulator can include a high switch coupled between an input voltage and a switched output; a low switch coupled between the switched output and a ground; and a ringing switch coupled between a capacitor and the switched output, wherein the ringing switch is closed prior to transition into a tristate where both the high switch and the low switch are open.

A method of reducing ringing in a switching regulator includes closing a ringing switch that coupled between a switched output and a capacitor; and transitioning a high switch coupled between an input voltage and the switch output and a low switch coupled between the switched output and a ground to a tristate where both the high switch and the low switch are open.

These and other embodiments are further discussed below with respect to the following figures.

DETAILED DESCRIPTION

Figure 1:
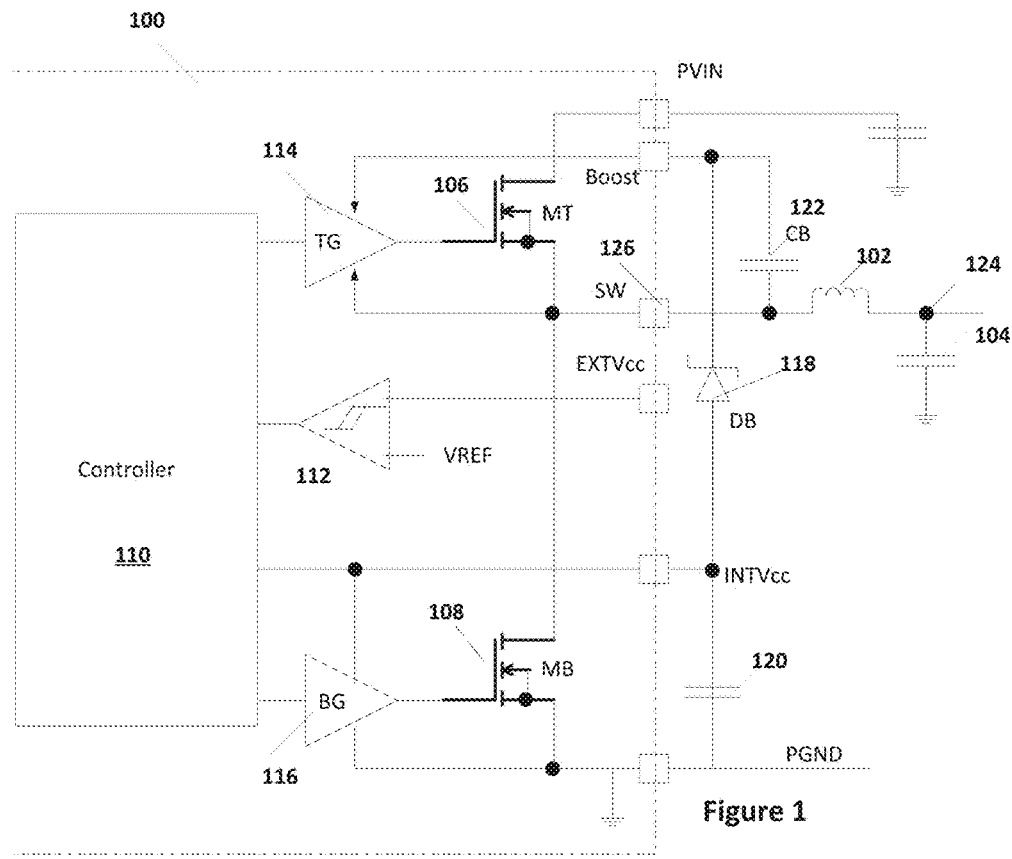
FIG. 1 illustrates an example switching regulator according to some embodiments of the present invention.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Many switching regulators use a NMOSFET for the high side switch and usually a so-called bootstrap circuit to provide a floating voltage to supply the gate driver current. The bootstrap circuit can be as simple as a diode and capacitor or the diode is replaced by an active switch. In some embodiments of this invention, a PMOS switch can be used in place of the diode. When the power stage is placed into tri-state mode (both switches are off), the bootstrap circuit is normally left in the bootstrap state (e.g., the PMOS switch is open). But if the bootstrap PMOS switch is set to be closed when the power stage goes into tri-state mode, then the bootstrap circuit becomes an effective RC snubber that rapidly dampens the ringing switch node.

Textbooks and public datasheets show either an external RC snubber connected to the switching node or an internal/external power switch connected across the inductor. The RC snubber requires two additional components and, due to the charging of the snubber capacitor, increases the switching losses and thus lowers regulator efficiency. Also, the ringing frequency can be quite low, around 10 MHz, and as this is the same order of magnitude as the switching frequency, creates potential switching operating interference. The $2^{nd}$ technique, if internal, adds a large power MOSFET and the associated drive circuitry, and if external, requires an additional pin to drive the external MOSFET. This adds cost and increases printed circuit board (PCB) area. Embodiments of the present invention adds no additional cost, area, or complexity as the bootstrap circuit operates exactly as usual, just it is turned on during tri-state condition.

FIG. 1 illustrates an example regulator chip 100 according to some embodiments of the present invention. As shown in FIG. 1, regulator chip 100 includes a top switch 106 that is serially coupled with a bottom switch 108. Top switch 106 and bottom switch 108 are driven by gate controllers 114 and 116, respectively, which themselves are controlled by controller 110. In practice, as discussed above, regulator chip 110 operates in three modes: top switch 106 is closed and bottom switch 108 is open; bottom switch 108 is closed and top switch 106 is open; and the tristate mode with both top switch 106 and bottom switch 108 open. It should be noted that the fourth configuration of switches 106 and 108, both being closed, results in a short between power and ground.

As is shown in FIG. 1, top switch 106 may be a MOSFET that couples a power input pad PVIN to the switched output pad SW 126 in response to a voltage supplied to the gate by gate driver 114. Lower switch 108 is configured to couple output pad SW 126 to ground PGND in response to a voltage applied to its gate by gate driver 116. In some embodiments, bottom switch 108 can be replaced by a diode, in which case gate driver 116 is not included. In some embodiments, a hysteresis controller 112 can be provided so that spurious switching of top switch 106 and bottom switch 108 can be avoided.

In completion of the switched regulator circuit, an inductor 102 and capacitor 104 are coupled between the switch pad SW and ground. Inductor 102 and capacitor 104 are switched by regulator 100 to provide a voltage at node 124.

In some embodiments, a bootstrap circuit provides current to gate driver 114. In FIG. 1, the bootstrap circuit includes a capacitor 120 and switch 118 serially coupled between ground and a boost pad, which provides current to gate driver 114. Further, the boost pad is coupled through a capacitor 122 to the switch pad SW 126. In FIG. 1, switch 118 is depicted as a diode and can be a PMOS switch. In some embodiments, bootstrap PMOS switch 118 is set to be closed when the power stage regulator 100 transitions into tri-state mode. Under that circumstance, then the bootstrap circuit becomes an effective RC snubber that rapidly dampens any ringing that occurs at switch node 126.

Figure 2:
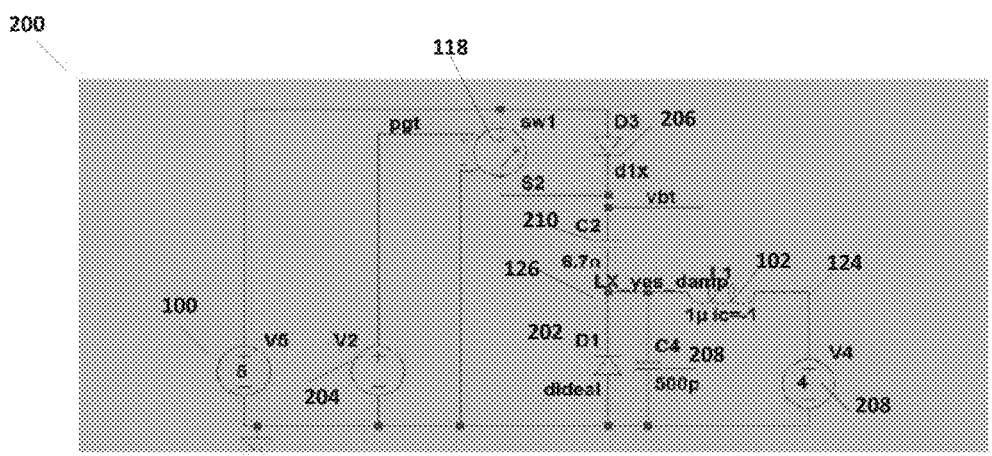
FIG. 2 illustrates a model of the example switching regulator illustrated in FIG. 1.

FIG. 2 illustrates a model of an embodiment of the invention, wherein switch 118 is depicted as a PMOS switching diode driven by switch controller 204. Switching regulator 100 is represented as a power supply 100 in FIG. 2. Switch controller 204 may, for example, be controlled by controller 110 of regulator 100 so that it closes switch 118 prior to transitioning into tristate mode (both top switch 106 and bottom switch 108 being open). Capacitor 104 is represented as supply 208 in the model. Diodes 206 and 202 represent parasitic diodes that are present in the circuit. Capacitor 208 represents capacitors 120 and 122 along with any parasitic capacitance that may occur.

Figure 3:
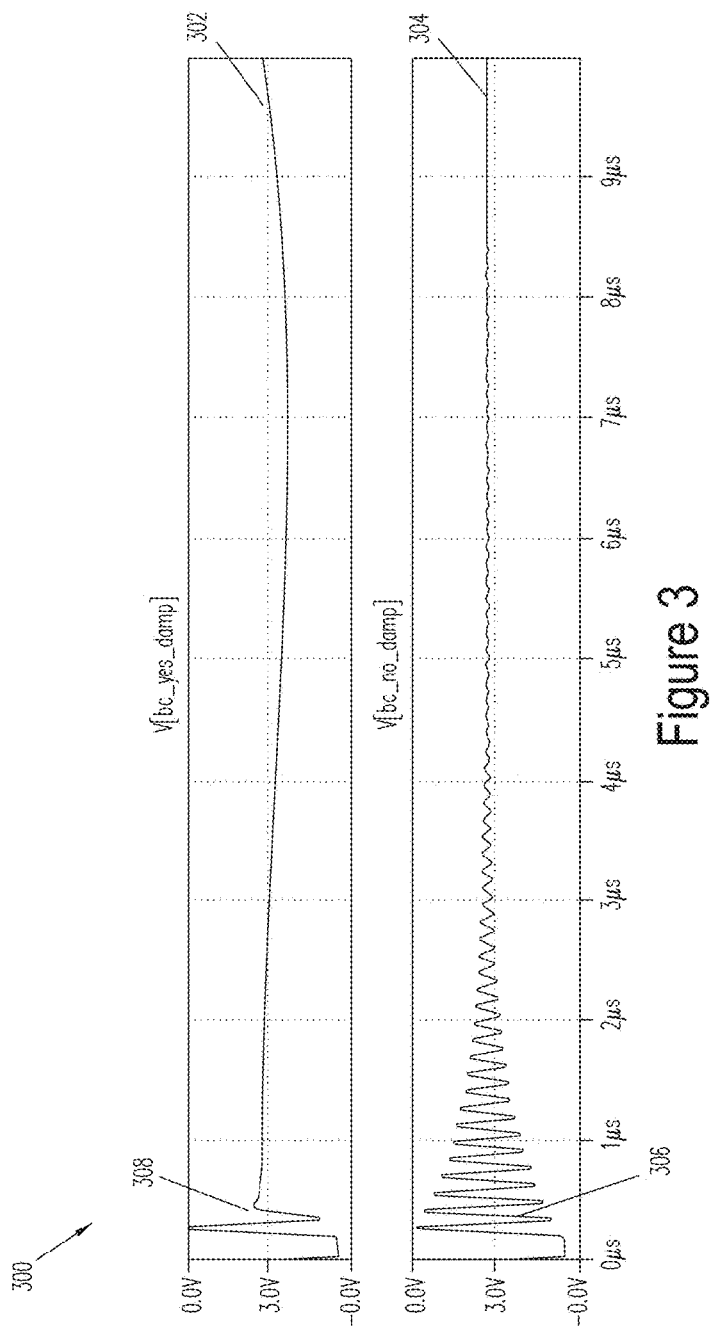
FIG. 3 illustrates a simulation of operation of the model illustrated in FIG. 2.

FIG. 3 illustrates comparative graphs 300, which illustrates operation of model circuit 200 with an embodiment of the invention and without an embodiment of the invention. In FIG. 3, trace 302 illustrates the voltage at node 126 during operation of the model circuit 200 illustrated in FIG. 2 where switch 118 is closed prior to regulator 100 transitioning into tristate mode. Trace 304 illustrated the voltage at node 126 during operation of the model circuit 200 illustrated in FIG. 2 where switch 118 is not closed prior to regulator 100 transitioning into tristate mode. As is illustrated in trace 304, a large and long-lasting ringing 306 is presented where switch 118 is not operated according to embodiments of the invention. Ringing 308 as illustrated in trace 302 is damped quickly compared with ringing 306.

Figure 4:
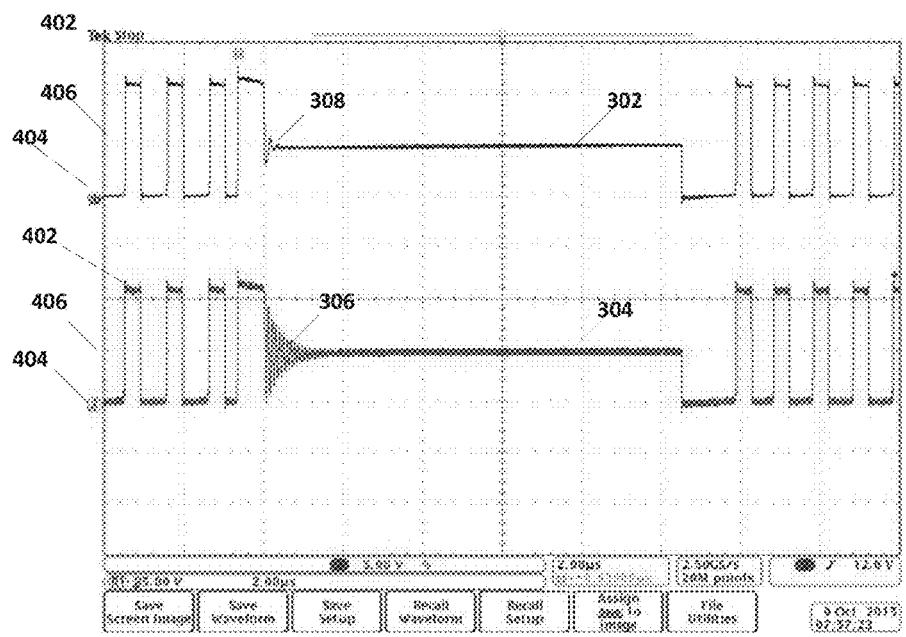
FIG. 4 illustrates a simulation of operation of the model illustrated in FIG. 2.

FIG. 4 illustrates trace 302 and 304 over an extended time. FIG. 4, in both trace 302 and 304, illustrates the voltage at node 126 while switching regulator 100 between a high state 402 (switch 106 closed and switch 108 open), a low state 404 (switch 106 open and switch 108 closed), and a tristate 406 (switch 106 open and switch 108 open). Each of trace 302 and 304 illustrates several cycles between a high state 402 and a low state 404 and one cycle from a high state 402 to a tristate 406. As is illustrated, the ringing 308 and ringing 306 illustrated in FIG. 3 is shown, again illustrating use of an embodiment of the invention (ringing 308) and without use of the invention (ringing 306).

The above detailed description is provided to illustrate specific embodiments of the present invention and is not intended to be limiting. Numerous variations and modifications within the scope of the present invention are possible. The present invention is set forth in the following claims.

What is claimed is:

1. A switching regulator, comprising:
    a high switch coupled between an input voltage and a switched output;
    a low switch coupled between the switched output and a ground; and
    a ringing switch coupled between a capacitor and the switched output,
    wherein the ringing switch is closed prior to transition into a tristate where both the high switch and the low switch are open.

2. The switching regulator of claim 1, wherein the ringing switch is a PMOS switch.

3. The switching regulator of claim 1, wherein the ringing switch is a diode.

4. The switching regulator of claim 1, wherein the low switch is a diode.

5. The switching regulator of claim 1, wherein the high switch is a MOSFET and the low switch is a diode.

6. The switching regulator of claim 1, wherein the high switch and the low switch are driven by a controller.

7. The switching regulator of claim 1, wherein the controller drives the high switch and the low switch into one of three states: the high switch closed and the low switch open, the high switch open and the low switch closed, and the tristate where the high switch open and the low switch open.

8. The switching regulator of claim 7, wherein the controller closes the ringing switch prior to transitioning to the tristate.

9. The switching regulator of claim 1, wherein the capacitor is coupled between the ringing switch and a ground.

10. A method of reducing ringing in a switching regulator, comprising:
    closing a ringing switch that is coupled between a switched output and a capacitor; and
    after the ringing switch is closed, transitioning a high switch coupled between an input voltage and the switch output and a low switch coupled between the switched output and a ground to a tristate where both the high switch and the low switch are open.

11. The method of claim 10, further including operating the switching regulator by alternately closing the high switch while opening the low switch and opening the high switch while closing the low switch.

12. The method of claim 10, wherein the low switch is a diode.

13. The method of claim 10, wherein the ringing switch is a diode.

14. The method of claim 10, wherein the ringing switch is a PMOS switch.

* * * * *